United States Patent [19]

Crook et al.

[11] Patent Number: 4,993,687
[45] Date of Patent: Feb. 19, 1991

[54] HYDRAULIC LOAD BINDER

[75] Inventors: Edward J. Crook, Tulsa; C. Ronald Garrett, Ramona, both of Okla.

[73] Assignee: The Crosby Group, Tulsa, Okla.

[21] Appl. No.: 75,198

[22] Filed: Jul. 16, 1987

Related U.S. Application Data

[63] Continuation of Ser. No. 820,716, Jan. 17, 1986, abandoned.

[51] Int. Cl.$^5$ .............................................. B25B 28/00
[52] U.S. Cl. .................................. 254/228; 24/68 CT
[58] Field of Search ............... 254/228, 231, 93 A, 254/93 R; 24/68 CT, 68 CD; 403/43, 44, 45, 46, 47, 48

[56] References Cited

U.S. PATENT DOCUMENTS

| | | | |
|---|---|---|---|
| 1,012,008 | 12/1911 | Post | 403/46 |
| 1,104,579 | 7/1914 | Thorsby | 269/32 |
| 1,131,846 | 3/1915 | Lowe | 254/231 |
| 1,245,607 | 11/1917 | Maxwell | 410/38 |
| 1,386,109 | 8/1921 | Hatfield | 403/48 |
| 2,383,061 | 8/1945 | Johnson | 254/228 |
| 2,383,061 | 8/1945 | Johnson | 254/228 |
| 2,559,185 | 7/1951 | Carroll | 280/179 |
| 2,559,185 | 7/1951 | Carroll | 280/179 |
| 2,773,700 | 12/1956 | Lasswell | 254/274 X |
| 2,935,300 | 5/1960 | Elsner | 254/199 |
| 3,120,898 | 2/1964 | Eaves | 214/654 |
| 3,395,932 | 8/1968 | Meyers | 280/179 |
| 3,409,157 | 11/1968 | Lull | 214/654 |
| 3,719,377 | 3/1973 | Schultz | 403/44 |
| 3,893,650 | 7/1975 | Turben | 254/93 R |
| 4,013,266 | 3/1977 | Lapp | 254/228 |
| 4,036,476 | 7/1977 | Douce et al. | 254/172 |

*Primary Examiner*—Katherine Matecki
*Attorney, Agent, or Firm*—Head & Johnson

[57] ABSTRACT

This is a chain tensioning system which uses a link section and a hydraulic power section. The link section is rectangular in shape and has a cross-link which is secured by a rod to a load hook external of the link. A securing nut is provided on the threaded rod inside the link frame. A hydraulic power section is used to move the cross-link away from the end of the link section and the securing nut then secures the cross-link in the tightened position. The hydraulic power section is then relaxed and removed and can be used on another appropriate link section.

3 Claims, 5 Drawing Sheets

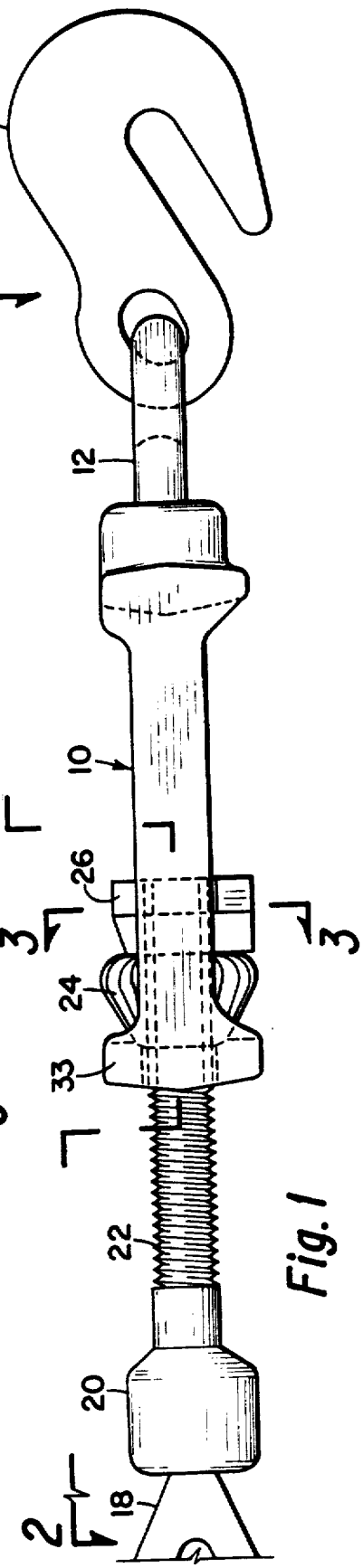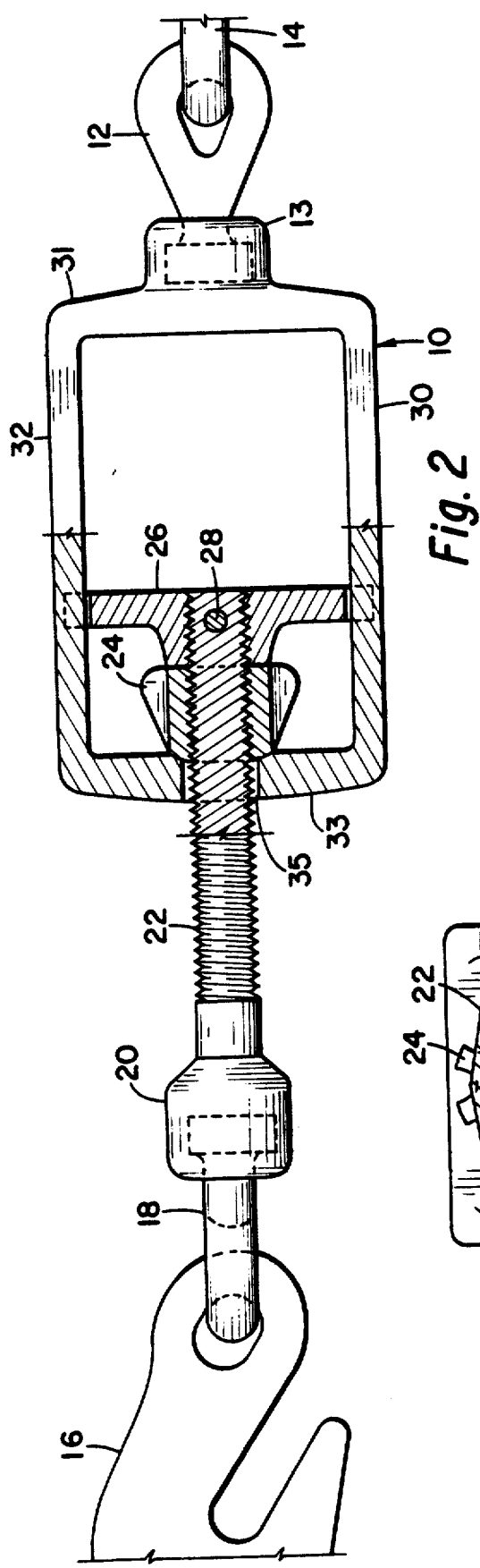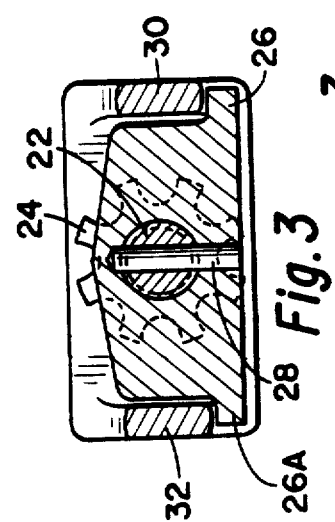

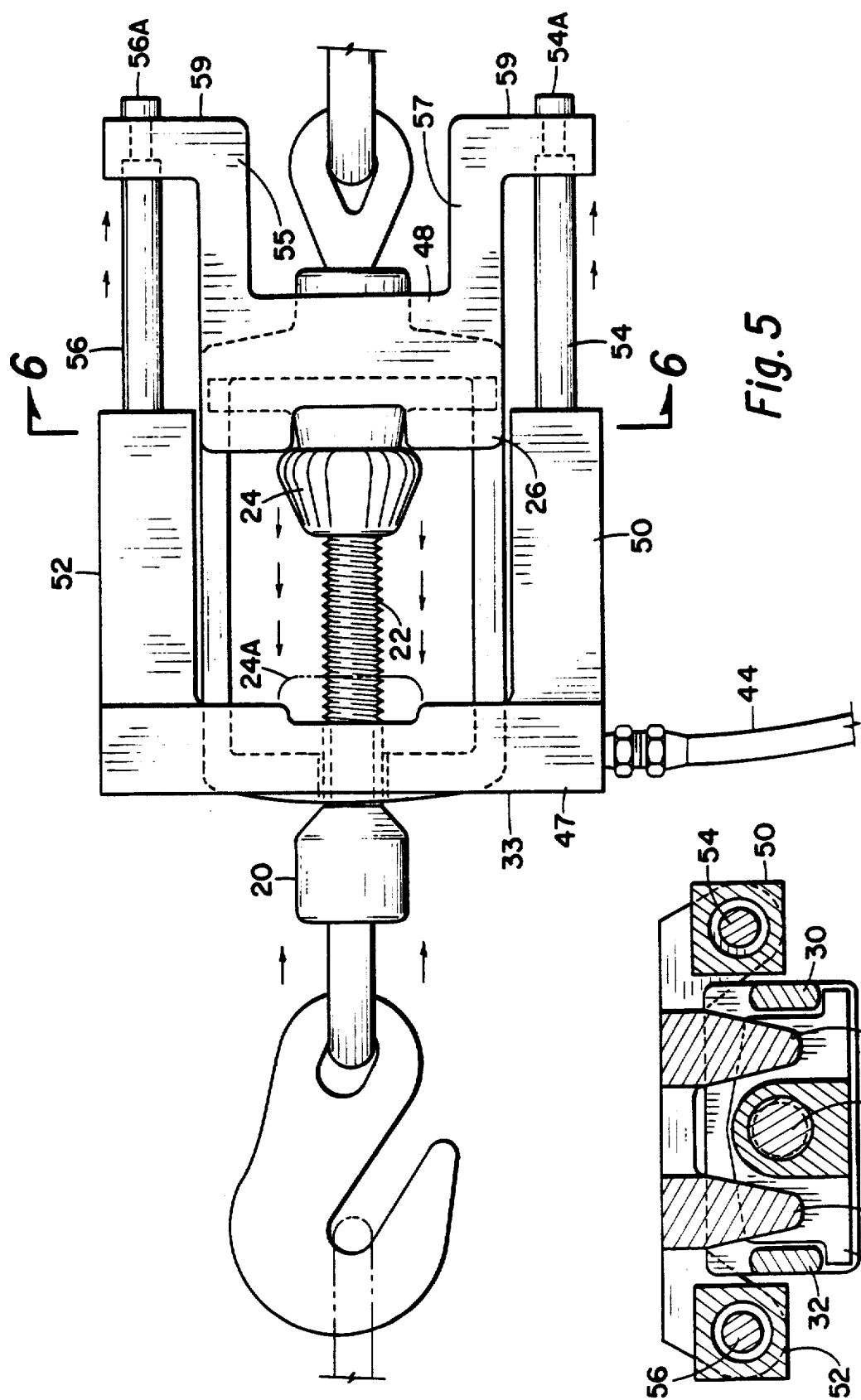

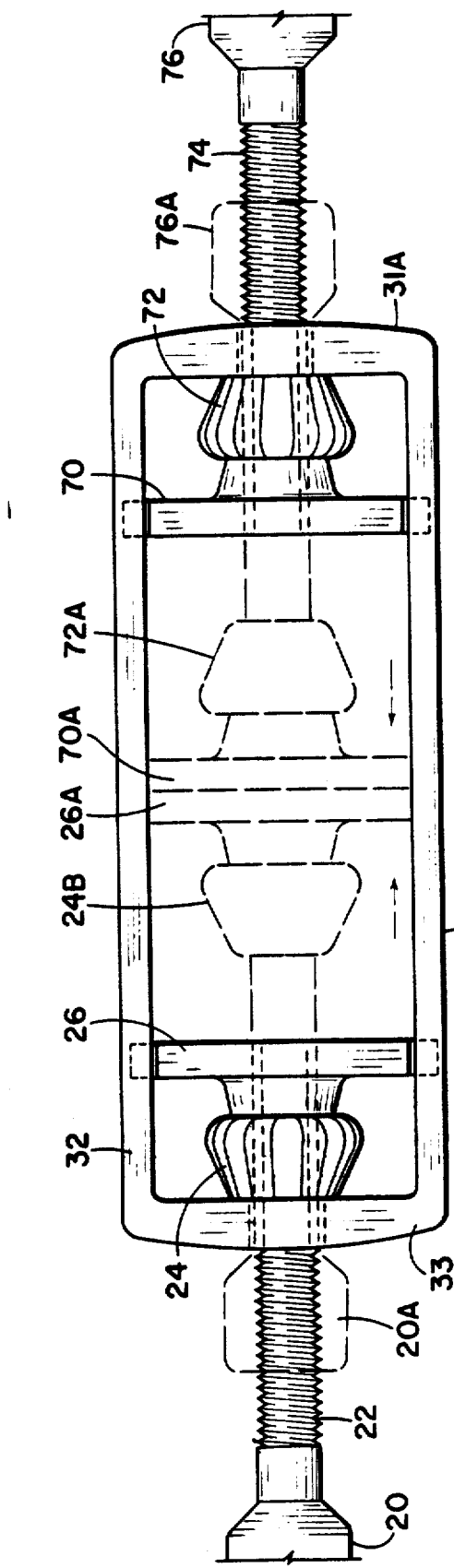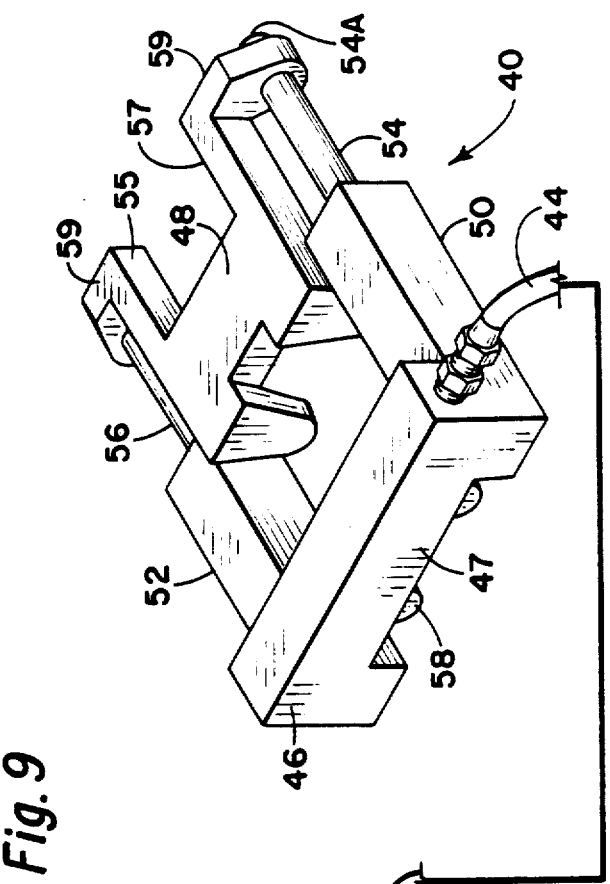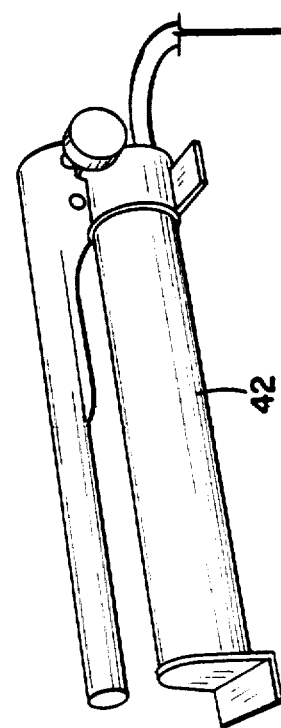

HYDRAULIC LOAD BINDER

This is a continuation of co-pending application Ser. No. 06/820,716 filed on Jan. 17, 1986, and now abandoned.

Disclosure Statement

The following patents relate generally to load binding devices or similar devices for tightening various loads. U.S. Pat. No. 1,104,579; 1,245,607; 3,120,898; 3,395,932; 3,409,157; 4,036,476; 2,559,185 and 2,773,700. U.S. Pat. No. 2,559,185 illustrates a load binder which uses a hydraulic cylinder for tightening chains. U.S. Pat. No. 2,773,700 is an automatic tension maintaining load device for vehicles which it uses a power cylinder to secure a load.

Background of the Invention

This invention relates to means for tensioning chains used to secure loads.

The use of chains to secure loads on trucks or other means of conveyances is well known. The device used to creat tension in the chain that is securing the load is commonly known as a load binder or boomer. Such devices has been used for many years. One of the principal types of devices is a lever operated over-center device as shown in Pat. No. 291,786. This device and concept it still the most popular device being used today for the tensioning of chains of purposes of securing loads on trucks. Another type of tensioning device is the ratchet load binder in which a pair of ratcheted screws are used to add tension to the chains to which the device is connected.

The over-center lever device is a simple tool which utilizes basically three links operating in concert with each other that achieves a relatively high mechanical advantage and, at the same time, achieving a reasonable taking up or shortening of the chain in the system.

A ratchet type load binder, is seen to be simply a screw mechanism utilizing the right hand and left hand thread principal similar to a turnbuckle so when the body member is rotated in one direction, the chain hooks will come together and, of course, if operated in the opposite direction, the chain hooks will be removed apart.

Summary of the Invention

This is a chain tensioning device and includes (a) a rectangular link section having a cross-link member (b) a hydraulic ram means which forces the cross-link away from the end of the rectangular section to a tension position and (c) means to hold the cross-link in the tension position after the hydraulic ram means is removed.

The rectangular section includes a rectangular shaped link with a first end and a second end, and a cross-link. The cross-link is connected to a threaded rod which goes through a hole in the first end of the rectangular link and is attached to an articulated hook. A securing nut is mounted on the threaded rod between the cross-link and the end member of the rectangular link. The cross-link then can slide along the rectangular link. A hydraulic motor is provided which is insertible between the cross-link and the end of the rectangular link. By applying hydraulic fluid under pressure, the hydraulic motor forces the cross-link away from the end member and thus would apply tension to a chain connected at one end to the articulated hook and at the other end to the other end of the rectangular link section. When the desired tension has been applied to the chain, the securing nut is rotated until it is in contact with the end member of the rectangular link. At this time, the hydraulic motor is relaxed and can be removed and the chain will be held under tension by the securing nut. The removed hydraulic motor means can then be used to tension another chain using another rectangular link section. When it is desired to disconnect the chain, the hydraulic motor is again inserted and forces the cross-link away from the end of the rectangular link and permits the securing nut to be loosened and rotated until it is in contact with the cross-link. Then the hydraulic ram is moved in the reverse direction so as to remove tension on the chain and when the tension is removed, the hydraulic motor can also be removed from the rectangular link section. It is thus seen that it is an object of this invention to provide a simple hydraulic method for use in tensioning many different chains.

Description of the Drawings

FIG. 1 is a side view of the rectangular link section of my invention.

FIG. 2 is a view taken along the line 2—2 of FIG. 1.

FIG. 3 is a view taken along the line 3—3 of FIG. 1.

FIG. 4 illustrates the hydraulic motor section of my invention using a hydraulic pump.

FIG. 5 is a top view of the hydraulic motor of FIG. 4 fully extended and positioned on the rectangular link section of FIG. 2.

FIG. 6 is a view taken along the line 6—6 of FIG. 5.

FIG. 9 is similar to FIG. 2 except that it has a cross-link and threaded rod on each end thereof.

Detailed Description of the Preferred Embodiment

Figure 7:
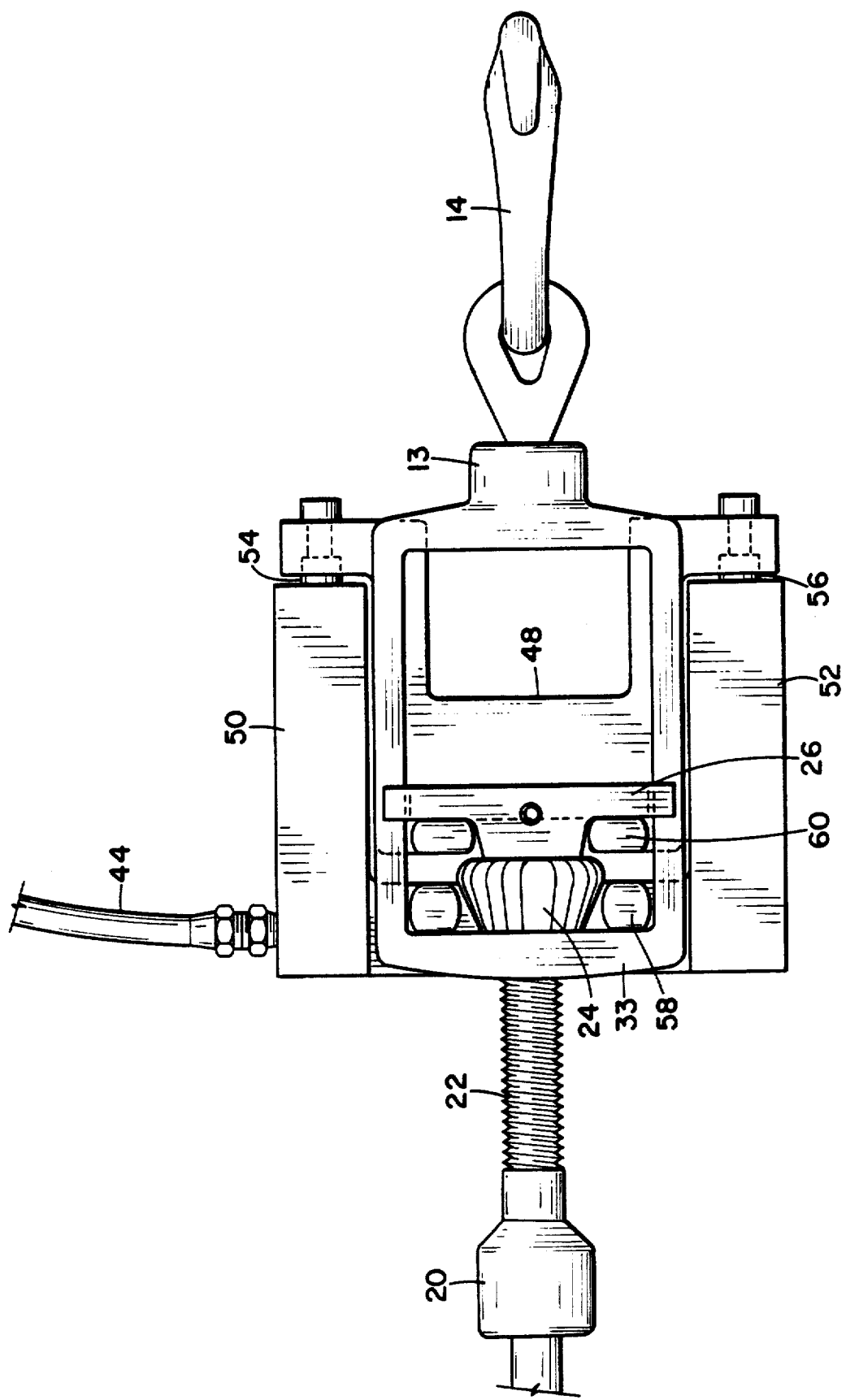
FIG. 7 is a bottom view of the hydraulic motor of FIG. 4 in its retracted position and placed n the rectangular link section of FIG. 2.

Attention is first directed to FIGS. 1, 2 and 3 which shows the basic rectangular link section. This includes a rectangular link 10 having sides 30 and 32 and end members 31 and 33. End 31 is connected to a shank 13 and swivel eye 12 to hook 14.

A cross-link member 26 is connected to a threaded rod or element 22 by pin 28. Threaded rod 22 extends through an untapped hole 35 in end 33. As clearly shown in FIG. 3, cross-link member 26 is provided with shoulders 26A which can move along sides 30 and 32 of the rectangular link section. A securing nut 24 is threadedly placed on threaded rod 22 between cross-link member 26 and end 33. A hook 16 is connected to swivel eye 18 which is inserted in shank 20 which is connected to or made a part of threaded rod 22. As cross-link member 26 is moved along sides 30 and 32, the hook 16 faithfully follows inasmuch as it is tied to an articulated hook assembly to threaded rod 22 which is secured to the cross-link member. Thus, by moving the cross-link member from its position in FIG. 2 to its furtherest position to the right, it is seen then that any chain that was fastened to the hooks 16 and 14 could have tension applied thereto.

We will next discuss such a means for forceably moving the cross-link member 26 from the end member 33. In this regard, attention is next directed to FIG. 4. Shown thereon is a hydraulic motor or ram for driving cross-link member 26 from end member 33. This includes a first U-shaped member 46 and a second U- shaped member 48. The U-shaped member 46 has an end member 47 and two side members or arms 50 and 52 which are hydraulic cylinders having hydraulic extension rams 54 and 56 respectively. These cylinders preferably contain return springs so as to retract the rams 54 and 56 when pressure is released on the hydraulic cylinders. End member 47 has two thumb-like link-end engaging members 58 which are used for engaging the inner side of end member 33. U-shaped member 48 is adapted to fit inside the cross-members 50 and 52 of U-shaped member 46. The U-shaped member 48 has extensions or arms 55 and 57 which are provided with shoulder members 59 to which the rods 54 and 56 are attached such as by nuts 54A and 56A as shown in FIG. 5. U-shaped member 48 is provided with cross-link member engaging elements 60 which extend downwardly for engaging cross-link member 26. A hydraulic pump 42 is provided and has an outlet hose 44 which is used to actuate the hydraulic motor 40. The hydraulic motor 40 is shown in FIG. 4 in its extended position. When it is in its retracted position, shoulders 59 are in contact with or near the ends of arms 50 and 52 of U-shaped member 46.

Figure 8:
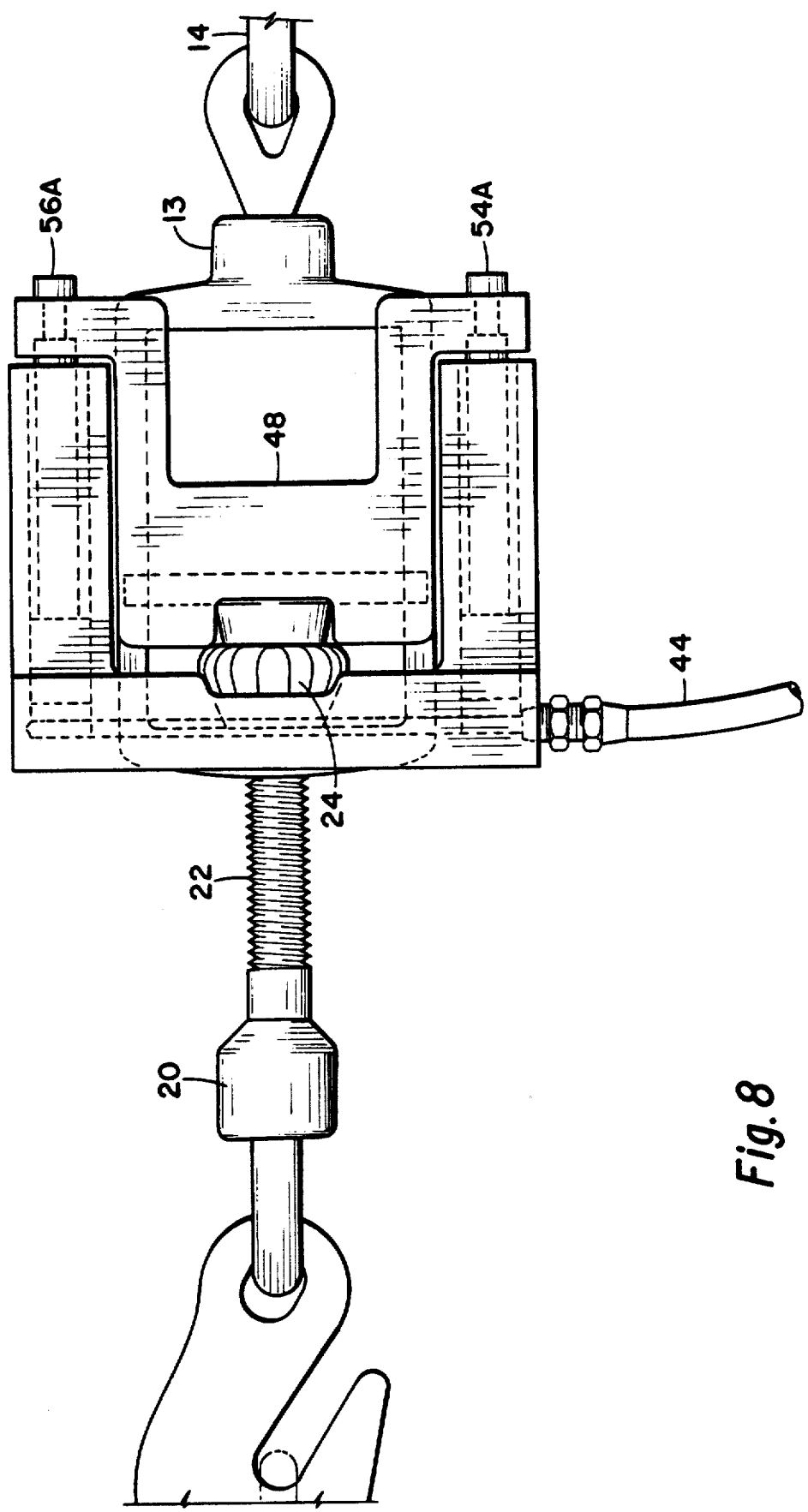
FIG. 8 is a top view of the device shown in FIG. 7.

Attention is next directed to FIGS. 7 and 8. FIG. 7 shows the bottom view of the assembly when the hydraulic motor 40 of FIG. 4 is positioned on the rectangular link section of FIG. 2. FIG. 7 shows the bottom view thereof and one can quickly see that link end engaging elements 58 are in contact with end 33 of the rectangular link. One can also see that cross-link engaging element 60 are engaged with cross-link element 26. By operating pump 42, one can force the rods 54 and 56 outwardly which forces link engaging means 58 and cross-link engaging element 60 apart. When these are forced apart, they also force the cross-link element 26 away from end 33 this position is shown in FIG. 5. The take up in the chain to which the hooks 14 and 18 are attached would be the amount of travel of cross-link member 26. This could typically be 2-½" which is generally sufficient to stretch the chain the desired amount as well as to allow for the initial slack required to hook up the chain. FIG. 6 is a view taken along the line 6—6 of FIG. 5 and is useful for visualizing the relative positions of the various parts. After the cross-link 26 has been moved to the position shown in FIG. 5 or whatever position is necessary for obtaining the desired tension in the chains that are being connected the rods 54 and 56 will hold this position because of conventional hydraulic control circuits and check valves. Securing nut 24 is then screwed along threaded rod 22 to its position indicated at 24A by the dotted lines in FIG. 5 to contact the inner wall of end member 33 of the cross-link. At this time, the pressure on the hydraulic motor 40 is relieved and the rods 54 and 56 forced back into the cylinders 52 and 50. If there is no pressure on the hydraulic fluid system, this can readily be done by return springs within the hydraulic cylinders. However, if desired, the power pistons 50 and 52 can be made double acting with proper hose connection so that they can be hydraulically driven to the collapsed position while using well known hydraulic ram principals. The hydraulic motor of FIG. 4 can then be utilized with another chain tensioning system utilizing the same type rectangular link section shown in FIGS. 1, 2 and 3. This can be used for as many as desired. When it is desired to remove the tension on the chains which are connected by hooks 14 and 16, the hydraulic motor 40 is inserted as shown in FIG. 5 and fluid under pressure is applied thereto until the force is relieved on the securing nut 24. Then the securing nut 24 is rotated to the position shown in FIG. 5. By relieving the hydraulic pressure on the hydraulic motor 40, the tension in the chains will cause the cross-link member 26 to go toward the position shown in FIG. 7. This relieves the tension in the chain and hooks 14 and 16 can then be removed from the chain and the hydraulic motor 40 can also be removed and used again however desired in accordance with the above description.

If a device with more take up is desired than that shown above in regard to FIG. 5 but one doesn't want to greatly increase the length of threaded rod 22 but still use the same hydraulic motor 40, then one can use the device shown in FIG. 9. What we have in effect is making the righthand portion of the rectangular link and image of the lefthand portion. We provide a longer link with sides 30 and 32. We provide a second cross-link member 70 having a securing nut 72, a threaded rod 74 and a shank 76 which are identical respectively to cross-link member 26, securing nut 24, rod 22 and shank 20. The length of sides 30 and 32 are sufficient to accommodate these features. In operation, one would hook the two end hooks of the device of FIG. 9 to the chain desired to be tensioned. One would then force cross-link 26 from end 33 just as described above and until shank 20 has the position of 20A and securing nut has the position of 24B and cross-link member 26 has the position of 26A. At this time, securing nut 24 would be screwed along threaded rod 22 until it contacts end 33. At that time the hydraulic motor of FIG. 4 can be removed and positioned on the righthand end between second cross-link 70 and the end member 31A, Then the same operation is applied to the righthand side until shank 76 is in the position shown in 76A and second cross-link 70 is in the position shown by dashed line 70A and securing nut 72 would be at the position shown by dotted line 72A. Then, of course, the securing nut would be screwed along the thread 74 until it comes in contact with end member 31A. Hydraulic motor 40 can then be removed. Release of tension on the chains can be obtained as described above in regard to that shown in FIGS. 5, 7 and 8. First cross-link 26 would be permitted to move to the relaxed position shown in FIG. 9 and then the second cross-link member 70 would be permitted to return to the solid line position shown in FIG. 9. A pump can be selected which requires an acceptable number of movements of the handle of the pumping device to obtain the desired tension. It is also apparent that the handle effort required by the pumping device is considerably less than the effort required by a lever load binder and is also less than that required by a ratchet binder.

While this invention has been described with a certain degree of particularity, it is manifest than many changes may be made in the details of construction and the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed:
1. A tensioning device for applying tension to a chain having a first end and a second end which comprises:
    a link member having a first side, a second side, a first end and a second end with a hole in said first end;

a threaded rod slidably extending through said hole;

a cross-link member secured to said threaded rod and mounted for movement between said ends;

a securing nut threadedly mounted on said threaded rod between said first end and said first cross-link member;

means to connect said threaded rod to an elongated member;

a hydraulic motor means for insertion within the link member between its sides and between said first end of said link member and said cross-link member for forcing said cross-link member away from said first end of said link member.

2. A tensioning device as defined in claim 1 in which said hydraulic motor means includes a first U-shaped member having a first arm and a second arm and having a power cylinder with an extendable rod in each said arm;

a second U-shaped member having a first and a second arm and a base which is inserted between said arms of said first U-shaped member;

means connecting the ends of each said rod with the ends of said first and second arms of said second U-shaped member;

link-end engaging elements extending from said first U-shaped member in a direction essentially perpendicular to the axis of said rods;

cross-link engaging elements extending downwardly from the base of said second U-shaped member, said cross-link engaging elements extending in the same direction as said link end engaging elements.

3. A tensioning device as defined in claim 1 including:

a second threaded rod extending through a hole in said second end;

a second cross-link member connected to said threaded rod;

a second securing nut mounted on said second threaded rod between said second cross-link member and said second end.

* * * * *